United States Patent [19]

Herman

[11] 4,091,413
[45] May 23, 1978

[54] SECURITY SYSTEM FOR PAY-TV CHANNEL

[76] Inventor: Richard E. Herman, 456 Dela Vina Ave., Monterey, Calif. 93940

[21] Appl. No.: 760,160

[22] Filed: Jan. 17, 1977

[51] Int. Cl.² ............................................. H04N 1/44
[52] U.S. Cl. .................................. 358/118; 358/114; 358/121
[58] Field of Search ....................... 358/114, 118–120, 358/121

[56] References Cited

U.S. PATENT DOCUMENTS

| | | | |
|---|---|---|---|
| 3,760,097 | 9/1973 | Burroughs et al. | 358/114 |
| 3,859,457 | 1/1975 | Kirk, Jr. | 358/114 |
| 3,996,418 | 12/1976 | Murphy et al. | 358/119 |
| 4,034,402 | 7/1977 | Brian | 358/118 |

Primary Examiner—S. C. Buczinski

[57] ABSTRACT

A system for securing a pay-TV channel by coherently moving the RF components of the channel (with or without an encoding signal) beyond the AFC holding range of commercially available tuners. The system is comprised of means for mixing the channel carrier with a signal that is varied beyond that AFC holding range at a low rate between approximately 0.75 Hz and 1000 Hz. For greater security, an amplitude-modulated encoding signal is injected at an IF frequency that is between the audio subcarrier and the video subcarrier. The encoding signal is preferably a multiple of the line scanning frequency in order to interfere with both video and audio components. For decoding, a converter with adequate AFC holding range at the receiver of a subscriber is coupled to the receiver by a sharply tuned filter which traps the injected encoding signal.

10 Claims, 3 Drawing Figures

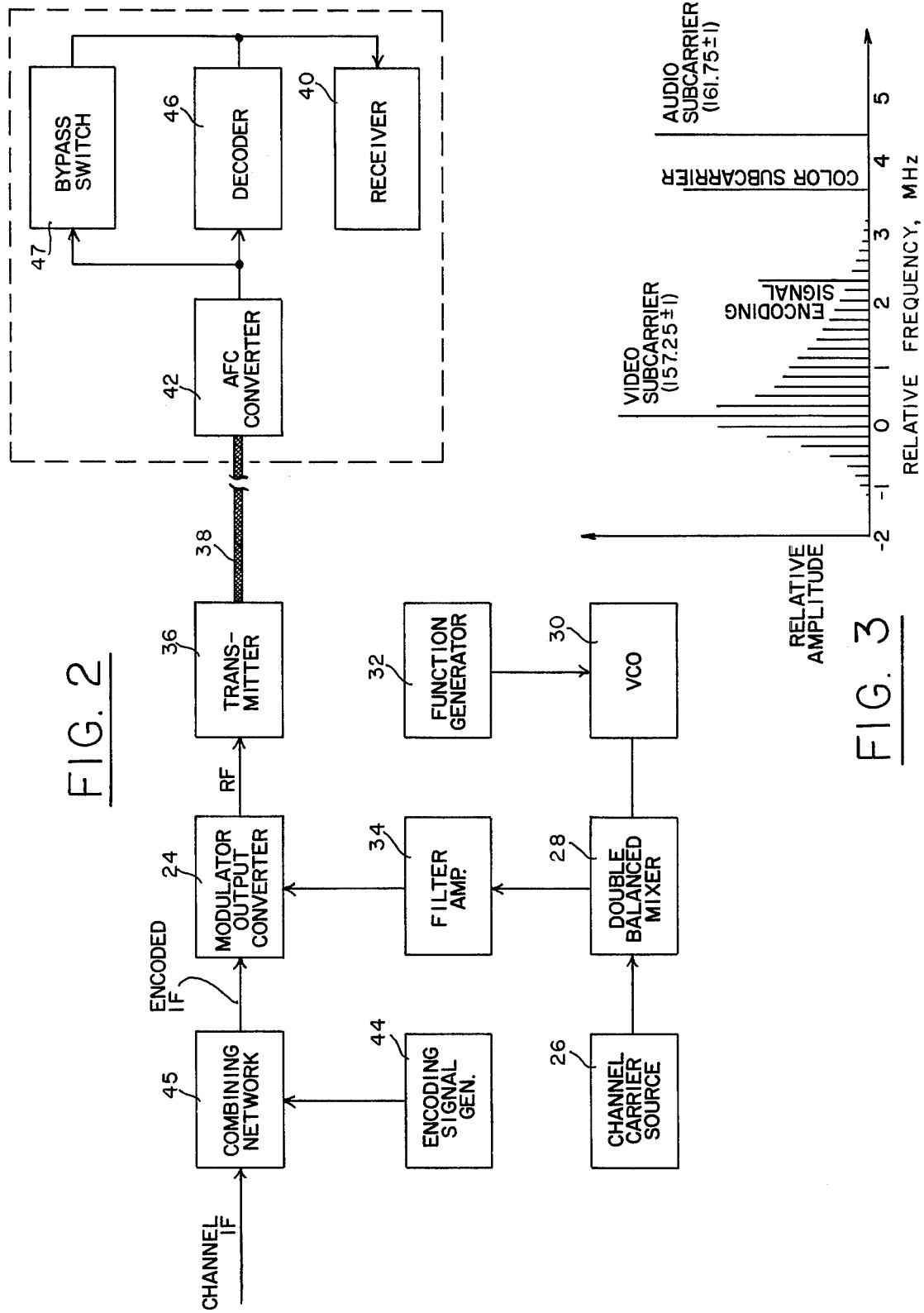

SECURITY SYSTEM FOR PAY-TV CHANNEL

BACKGROUND OF THE INVENTION

This invention relates to a method and apparatus for providing security against unauthorized reception of a pay-TV channel in community antenna television (CATV) systems, and over-the-air systems.

It has become common practice to transmit pay-TV programs on a channel to which commercial television receivers cannot be tuned, and to then provide subscribers with a converter which receives the channel of interest and converts it to a designated one of the standard channels. However, the security provided by that practice is easily defeated by detuning commercially available receivers to a point where the channel of interest is received on some channel other than the designated one. Another way in which security can be defeated is by using a converter that can be manually tuned to convert the channel of interest to a selected channel. The use of such manually tuned converters is illegal, as is the practice of detuning a receiver in order to pirate a pay-TV program. The object is to defeat such illegal practices. It is recognized that ultimate security resides in apprehanding the "pirates," but the practicality of the situation dictates against relying on that ultimate solution to the problem. What is required is an economical way of defeating at least a majority of the attempts at these techniques for pirating pay-TV programs.

The most economical way of providing security is with a passive system that involves no added subscriber equipment, or very little added subscriber equipment. Otherwise the cost of adding subscriber equipment may be greater than the loss of potential revenue. It has been discovered that by continually moving the RF components at the modulator output converter of the transmitter beyond the AFC holding range of tuners in commercially available receivers, a completely passive security system can be provided without any added cost beyond providing subscribers with heterodyne converters having an AFC range that is both adequate and greater than the AFC range of commercially available receivers. A range of ±5 MHz would be adequate to defeat the AFC of all commercially available receivers, and since converters have generally been available commercially with only manual tuning, both techniques (detuning a receiver and using an illegal converter) can be defeated. It has been further discovered that a range of ±1 MHz is beyond the holding AFC range of about 75% of the commercially available tuners, but not beyond the range of pay-TV converters already in use. Consequently, without any added cost in modification of converters already in use, security of pay-TV programs can be achieved in existing systems by continually moving the RF components of the channel of interest over a range of just ±1 MHz.

Another passive system for pay-TV security which is inexpensive to install consists of injecting an encoding signal to the channel os interest at the transmitter and trapping the encoding signal at the receiver with a finely tuned filter. The encoding signal is a modulated RF signal at a frequency between the video subcarrier and the audio subcarrier, and preferably at a frequency that is a multiple of horizontal sync. But such a security system can be defeated by tuning an illegal converter so that it suppresses the lower adjacent sound, and then tuning the receiver to place the encoding signal in the receiver trap for the lower adjacent sound. The result will, however, be a black and white picture because the color and audio components will then be out of the pass band. It has been discovered that the combination of these techniques, injecting an encoding signal and coherently moving the RF components of the channel at a low rate between approximately 0.75 Hz and 1000 Hz, will provide virtually 100% security against piracy through the use of illegal converters and/or detuning receivers.

SUMMARY OF THE INVENTION

In accordance with the present invention, a television security system is provided by coherently moving the RF components of a pay-TV channel beyond the automatic frequency control (AFC) holding range of tuners in commercially available television receivers. This is accomplished by modulating a voltage-controlled oscillator (VCO) using a function generator to vary the output of the VCO approximately 1 MHz on either side of its nominal frequency with the rate of variation in a range from approximately 0.75 Hz to approximately 1000 Hz, and preferably closer to 0.75 Hz. The frequency modulated output of the VCO is mixed in with a channel carrier from a stable oscillator. The modulated channel carrier is then mixed in the modulator output converter of the transmitter with the combined video and audio IF to provide a modulated RF output. As a consequence of thus modulating the RF output, a tuner not having an authorized AFC converter at its input is incapable of receiving the channel of interest.

In accordance with a further feature of the invention, an encoding signal (with or without modulation) is injected into the combined video and audio IF signals at a frequency between the video subcarrier and the audio subcarrier (preferably at a multiple of the line scanning frequency). The encoding signal thus appears at the subscriber's receiver as an RF component moved coherently with other RF components of the channel. As a consequence, an unauthorized receiver somehow provided with a converter to receive the channel of interest cannot successfully receive the pay-TV program because of the presence of the encoding signal, and the unauthorized receiver cannot be successfully tuned to trap the encoding signal in the lower adjacent sound trap because the center frequency of the encoding signal is modulated over a range greater than the width of the lower adjacent sound trap due to the modulation of the channel carrier.

The novel features of the invention are set forth with particularly in the appended claims. The invention will best be understood from the following description when read in conjunction with the accompanying drawings.

BRIEF DESCRIPTION OF THE DRAWINGS

FIG. 2 is a block diagram of a pay-TV security system in accordance with another feature of the invention.

FIG. 3 is a frequency distribution diagram useful in understanding the operation of the system shown in FIG. 2 exemplary video channel.

DESCRIPTION OF PREFERRED EMBODIMENTS

Figure 1:
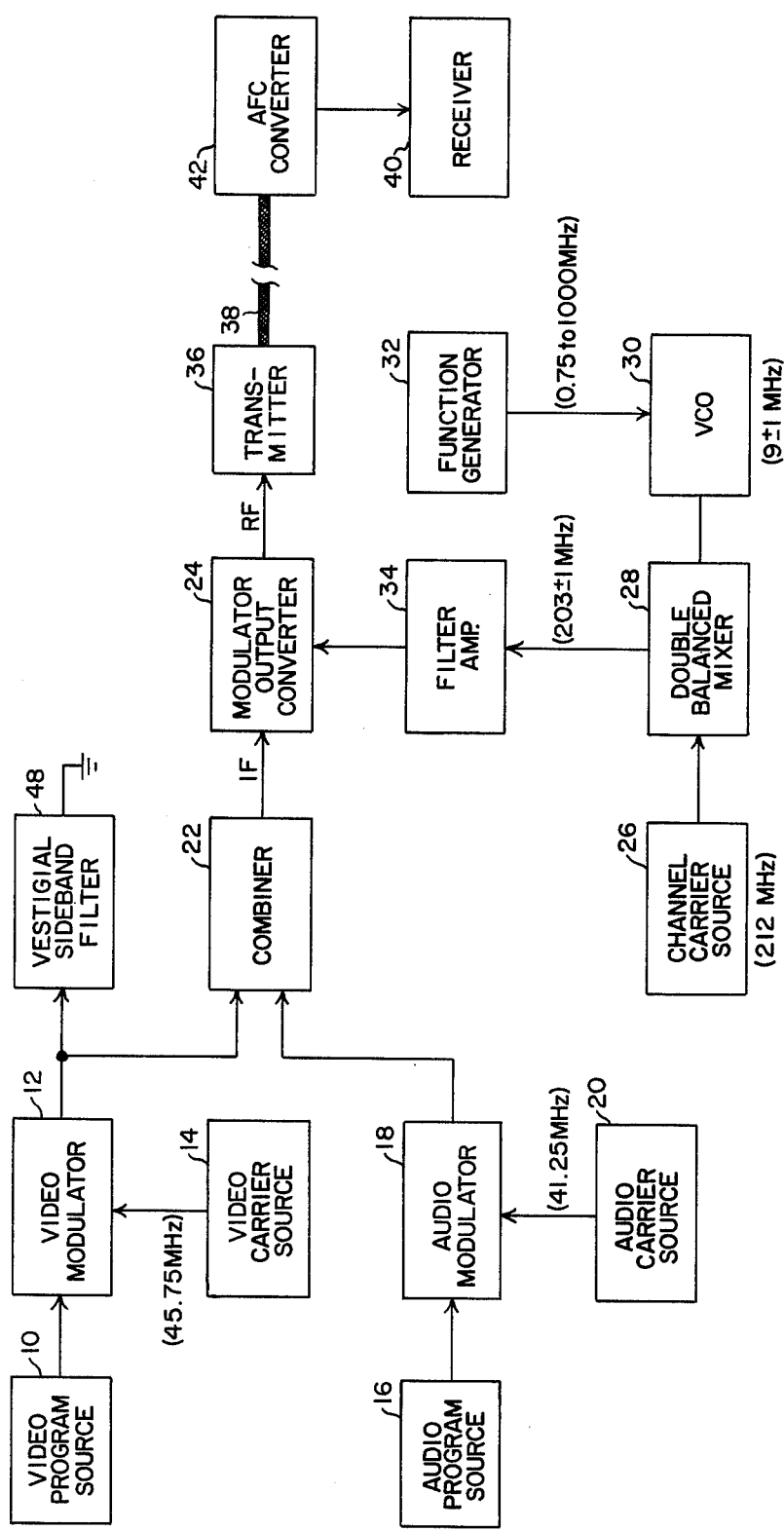
FIG. 1 is a block schematic diagram of a pay-TV security system in accordance with one feature of the invention.

Referring now to FIG. 1, a program source 10 generated video signals and applied them to a modulator 12. A video subcarrier from a source 14 is applied to the video modulator 12. Similarly, a program source 16 generates the audio program which accompanies the video program. Its output is applied to a modulator 18 which receives an audio subcarrier from a source 20. The outputs of the video and audio modulators are combined in a circuit 22, thus producing a modulated IF signal comprised of the combined video and audio modulated subcarriers. The frequencies of the video and audio subcarriers are typically at 45.75 MHz and 41.25 MHz respectively, for a transmission channel G that is convertible at a receiver to channel 4 as an example.

The IF signal is applied to a modulator output converter 24 for mixing with a channel carrier from a source 26. However, in accordance with the present invention, the channel carrier is not applied directly to the output converter, a balanced mixer. Instead the channel carrier is first mixed in a double balanced mixer 28 with the output of a voltage-controlled oscillator (VCO) 30 that is modulated about its nominal frequency by an amount which is sufficient to coherently move the RF components of the channel transmission beyond the AFC holding range of tuners in commercially available receivers. The VCO is frequency modulated by the output of a function generator 32 which produces a variable voltage signal of suitable form, such as a sinewave, at a rate between approximately 0.75 Hz and 1000 Hz, and of sufficient amplitude to vary the output of the VCO sufficiently on each side of its nominal frequency.

In this exemplary embodiment, the frequency of the channel carrier source is selected to be 212 MHz and the nominal frequency of the VCO is selected to be 9 MHz in order to provide a modulated carrier frequency of 203 ±1 MHz at the output of the double balanced mixer 28. That modulated carrier frequency is mixed with the video and audio IF to produce video and audio RF components of 157.25 ±1 MHz and 161.75 MHz, respectively, for channel G. These parameters were not chosen because of any restrictions of the present invention, but rather to accommodate existing converters. For converters with a greater AFC range, the frequency modulation of the carrier by control of the VCO could be greater, such as ±3 MHz, or ±5 MHz, with even greater advantage.

The output of the double-balanced mixer 28 is filtered through a filter amplifier 34 to achieve proper spectral purity and amplitude of the modulated channel carrier applied to a transmitter 36. The latter transmits the RF components through a cable 38 (or the air) to a receiver 40 via an AFC converter 42 designed to lock onto the channel of interest, channel G in the example, and convert it to the designated channel 4. In that manner, a receiver not equipped with the AFC converter 42 will be incapable of locking onto the channel of interest because the channel carrier has been frequency modulated over a range beyond the AFC holding range of the commercially available receivers. An unauthorized observer may attempt to use a manual tuning converter, but that is virtually impossible since the frequency of the channel carrier is being continually varied by the output of the VCO.

Security over approximately 75% of all commercially available receivers is achieved by a VCO modulation range of ±1 MHz, which is within the holding range of AFC converters presently in use. For greater security, the modulation range may be increased to as much as ±3 MHz, or even ±5 MHz, but then AFC converters would have to be redesigned for a commensurately large holding range. It would be preferably to continue to use existing AFC converters and to increase security to virtually 100% by injecting into the channel of interest an encoding signal, a technique which will now be described with reference to FIGS. 2 and 3.

Referring now to FIG. 2, the system of FIG. 1 is modified to inject an encoding signal from a generator 44 into the channel IF (from combiner 22 not shown in FIG. 2) through a combining network 45. That signal may take any form which permits extracting it at the receiver, such as an amplitude-modulated signal at a frequency that is between the video subcarrier and the audio subcarrier, and preferably at a frequency that is a multiple of the line scanning frequency such as approximately 2.257 MHz ±1 KHz above the video subcarrier as shown in FIG. 3. The mere presence of that encoding signal in the pay-TV channel interferes with horizontal synchronization, as well as other components of the video and audio program. The extent of the interference increases as the level of the encoding signal is increased vis-a-vis the level of the video carrier. Amplitude modulation of the encoding signal increases the interference. To remove the interference at the receiver of the subscriber, a decoder 46 is connected between the receiver and the AFC converter to extract the encoding signal. Where the encoding signal is of the nature just described, the decoder may be comprised of a passive trap, i.e., a sharply tuned notch filter. The result is that the encoding signal stabilized by the AFC converter is removed from the signal input to a subscriber's receiver.

The technique of encoding a pay-TV channel by injecting a signal in the transmitted RF between the video and audio components is itself not new. That technique has been implemented by Tanner Electronic System Technology, Inc. of Van Nuys, Calif. What is new is to both inject the encoding signal and to coherently modulate all of the RF components of the pay-TV channel, including the encoding signal, over a range which is beyond the AFC holding range of commercially available receivers, but not beyond the AFC holding range of a subscriber's converter. Unless a nonsubscriber has an AFC converter, he cannot defeat the encoding signal by somehow suppressing the lower adjacent sound the tuning the receiver to trap the encoding signal in the lower adjacent sound trap because the frequency of the encoding signal is modulated by the amount that the VCO output is modulated. An added advantage of this encoding signal technique is that the range of the VCO modulation need not be as much as when that is the only security technique employed; it need be only enough to continually move the encoding signal out of the lower adjacent sound trap of the receiver, such as 200 KC, instead of 1 MHz or more. The encoding signal will jam the receiver each time it is moved out of the trap. The security achieved by this combination of techniques is virtually 100%, but still inexpensive because it requires for each subscriber only a passive notch filter in addition to an AFC converter already installed.

Although particular embodiments of the invention have been described and illustrated herein, it is recognized that modifications and equivalents may readily occur to those skilled in the art and consequently it is intended that the claims be interpreted to cover such modifications and equivalents.

I claim:

1. In a pay-TV system for transmitting on a carrier a program to a subscriber over one channel of interest for conversion to a preselected channel of a commercially available receiver by a converter having automatic frequency control operative over a greater holding range than automatic frequency control of a tuner in said receiver, a security system comprised of means for frequency modulating the transmitted channel carrier over a modulating range that is between the automatic frequency control holding range of said receiver and the automatic frequency control holding range of said converter, and function generating means for generating a low frequency signal for controlling said modulating means to periodically vary the frequency of said transmitted carrier over said modulating range, thereby periodically and coherently moving RF components of said channel of interest beyond the automatic frequency control holding range of tuners in commercially available receivers at the rate of said low frequency signal.

2. A security system as defined in claim 1 wherein said frequency modulating means is comprised of
a voltage controlled oscillator for producing a modulated signal in response to said low frequency signal from said function generating means,
means for generating a frequency signal which, when mixed with said modulated signal, produces said transmitted carrier signal for said one channel of interest, and
means for mixing said frequency signal and said frequency output of said voltage controlled oscillator to produce said transmitted carrier signal.

3. A security system as defined in claim 1 including means for generating an encoding signal at a frequency between video and audio components of said one channel of interest, means for combining said encoding signal with said video and audio components in said one channel of interest, and means at the output of said converter for trapping said encoding signal.

4. A security system as defined in claim 1 wherein said modulating range is from at least about 1 megahertz above to about 1 megahertz below the nominal frequency of the transmitted carrier for said channel of interest.

5. A security system as defined by claim 4 wherein said frequency modulating means is comprised of
a voltage controlled oscillator operative at a nominal frequency of about nine megahertz and responsive to said low frequency signal from said function generating means for varying the frequency output thereof over said modulating range,
means for generating a frequency signal which, when mixed with said frequency output of said voltage controlled oscillator, produces said transmitted carrier signal for said one channel of interest, and
means for mixing said frequency signal and said frequency output of said voltage controlled oscillator to produce said transmitted carrier signal.

6. A method of securing a pay-TV channel of interest transmitted to subscribers on a carrier for conversion to a preselected channel of commercially available receivers by converters having automatic frequency control operative over a greater holding range than automatic frequency control of tuners in said receivers, said method comprising periodically varying the frequency of said carrier over a range between the holding range of automatic frequency control of said tuners in said receivers and the holding range of said converters, thereby periodically and coherently moving RF components of said channel of interest beyond the automatic frequency control holding range of tuners in commercially available receivers.

7. A method as defined in claim 6 wherein said carrier is varied periodically at a low rate between approximately 0.75 Hz and 1000 Hz.

8. A method as defined in claim 6 wherein said carrier is periodically varied over at least a range from about 1 megahertz above to about 1 megahertz below the nominal frequency of the transmitted carrier of said channel of interest.

9. A method as defined in claim 6 including the step of combining an encoding signal with audio and video components of said channel of interest at a frequency between said audio and video for transmission to subscribers on said carrier as an additional RF component, and at the receiver of each subscriber trapping the encoding signal with a decoder coupling the receiver to the converter.

10. A method as defined in claim 9 including the step of modulating said encoding signal.

* * * * *